(12) United States Patent
Porter

(10) Patent No.: US 11,365,754 B2
(45) Date of Patent: Jun. 21, 2022

(54) DETACHABLE FASTENER ASSEMBLY

(71) Applicant: AMI INDUSTRIES, INC., Colorado Springs, CO (US)

(72) Inventor: Ryan Porter, Monument, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 616 days.

(21) Appl. No.: 16/387,862

(22) Filed: Apr. 18, 2019

(65) Prior Publication Data
US 2020/0332815 A1   Oct. 22, 2020

(51) Int. Cl.
*F16B 5/06* (2006.01)
*F16B 5/00* (2006.01)
*F16B 19/10* (2006.01)

(52) U.S. Cl.
CPC .......... *F16B 5/0657* (2013.01); *F16B 5/0088* (2013.01); *F16B 19/1081* (2013.01); *Y10T 403/75* (2015.01)

(58) Field of Classification Search
CPC .... F16B 5/0036; F16B 5/0052; F16B 5/0084; F16B 5/0088; F16B 5/0621; F16B 5/0642; F16B 5/0657; F16B 5/0692; F16B 21/09; F16B 19/1081; F16B 19/109; Y10T 403/595; Y10T 403/7094; Y10T 403/75; B64D 11/0636; B60R 2011/0019; B60R 2011/0021; B65D 25/20; B65D 25/22; A47B 97/00; A47B 2097/006; A47F 5/0807; A47F 5/0876
USPC .............. 403/DIG. 10; 220/476, 480; 411/45
See application file for complete search history.

(56) References Cited

U.S. PATENT DOCUMENTS

| 3,606,814 A | * | 9/1971 | MacKenzie | B25B 31/00 411/80.2 |
| 4,487,330 A | * | 12/1984 | Grover | F16B 2/185 220/3.8 |
| 4,749,298 A | * | 6/1988 | Bundt | F16B 35/04 403/23 |
| 4,813,809 A | * | 3/1989 | Stratman | F16B 2/10 248/500 |
| 5,529,265 A | * | 6/1996 | Sakurai | A47C 7/723 244/118.5 |
| 5,568,675 A | * | 10/1996 | Asami | F16B 19/1081 24/297 |
| 6,142,435 A | * | 11/2000 | Lodi | F16B 21/09 248/221.12 |

(Continued)

FOREIGN PATENT DOCUMENTS

JP   2009166158   7/2009
JP   2016207442   12/2016

(Continued)

*Primary Examiner* — Amber R Anderson
*Assistant Examiner* — Kevin J Baynes
(74) *Attorney, Agent, or Firm* — Snell & Wilmer L.L.P.

(57) ABSTRACT

A fastener assembly includes a plunger, a grommet, and a lever arm. The plunger may include a head, a tip portion, and a longitudinal centerline axis. The grommet may be configured to receive the tip portion of the plunger. The tip portion of the plunger may be axially movable relative to the grommet between a latched state and an unlatched state. The lever arm may be coupled to the plunger between the head and the tip portion. The lever arm extends from the plunger at an angle relative to the longitudinal centerline axis, with the lever arm being actuatable to switch the fastener assembly from the latched state to the unlatched state, according to various embodiments.

18 Claims, 6 Drawing Sheets

(56) References Cited

U.S. PATENT DOCUMENTS

| | | | | |
|---|---|---|---|---|
| 6,480,703 B1* | 11/2002 | Calderone | ............... | G10L 15/30 |
| | | | | 348/723 |
| 6,763,745 B2* | 7/2004 | Morasse | ................. | F16B 21/04 |
| | | | | 411/349 |
| 6,829,812 B2* | 12/2004 | Ozios | ........................ | B60J 1/02 |
| | | | | 16/444 |
| 6,840,703 B2* | 1/2005 | Blanchard | ............. | F16B 19/109 |
| | | | | 403/322.2 |
| 6,883,870 B2* | 4/2005 | Jost | ..................... | B60R 11/0235 |
| | | | | 297/391 |
| 6,979,162 B2* | 12/2005 | Kato | ..................... | F16B 19/008 |
| | | | | 411/371.1 |
| 7,040,697 B1* | 5/2006 | Tuccinardi | ........... | B60R 11/0235 |
| | | | | 297/217.3 |
| 7,607,875 B2* | 10/2009 | Shinozaki | ............ | F16B 21/078 |
| | | | | 411/45 |
| 7,841,816 B2* | 11/2010 | Jodeleit | ............... | B60R 13/0206 |
| | | | | 411/34 |
| 7,862,274 B2* | 1/2011 | Limpert | .............. | F16B 19/1081 |
| | | | | 411/45 |
| 8,152,234 B2* | 4/2012 | Terleski | ............. | B64D 11/0636 |
| | | | | 297/188.04 |
| 8,348,567 B2* | 1/2013 | Schwarzkopf | ...... | F16B 19/1081 |
| | | | | 411/45 |
| 9,046,118 B2* | 6/2015 | Schmitz | .................. | F16B 2/185 |
| 9,631,653 B2* | 4/2017 | Flynn | .................. | F16B 19/1081 |
| 9,856,899 B2* | 1/2018 | Kuhm | ..................... | F16B 21/06 |
| 9,982,700 B2* | 5/2018 | Najima | .................. | B60R 13/0256 |
| 2001/0024056 A1* | 9/2001 | Romca | ............... | B64D 11/0636 |
| | | | | 297/217.1 |
| 2009/0203251 A1 | 8/2009 | Takahashi et al. | | |

FOREIGN PATENT DOCUMENTS

| | | | | |
|---|---|---|---|---|
| KR | 20150046848 A | * | 5/2015 | |
| WO | WO-9512762 A1 | * | 5/1995 | .......... F16B 19/1081 |
| WO | WO-9726811 A1 | * | 7/1997 | ............. B64D 11/06 |
| WO | WO-2009018311 A1 | * | 2/2009 | ............. F16B 21/16 |

\* cited by examiner

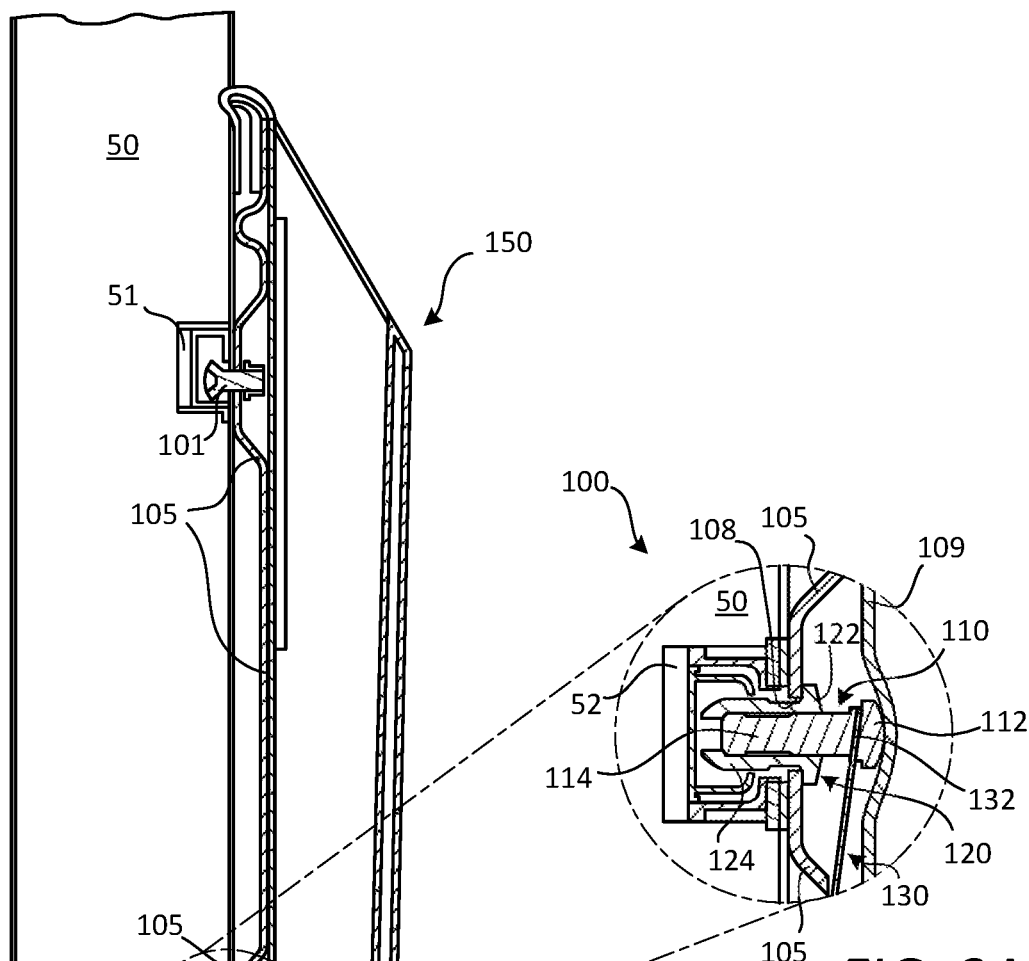
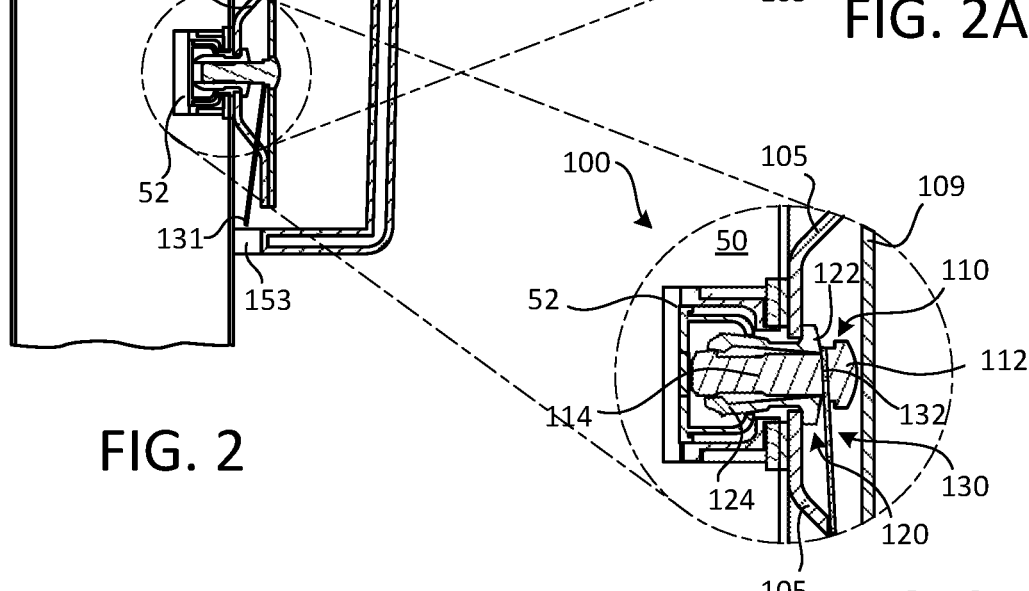

DETACHABLE FASTENER ASSEMBLY

FIELD

The present disclosure relates to fasteners, and more specifically to fastener assemblies for detachably mounting components to a structure.

BACKGROUND

There are many conventional fasteners and configurations for detachably mounting a component to a structure. The detachable, reversible nature of the mounting configuration enables the component to be repaired, upgraded, replaced, or otherwise modified. For example, literature pockets/pouches attached to aircraft walls may need to be periodically repaired and/or replaced, and thus conventional fastening configurations have been utilized to detachably mount these literature pockets/pouches to the aircraft walls. However, conventional fastening configurations often have various drawbacks and shortcomings, especially pertaining to weight and accessibility. For example, many conventional fastening configurations utilize multiple plates, such as a first mounting plate attached to a structure and a second plate for interfacing with the first plate and the component to be mounted. Using multiple plates in this manner not only increases the complexity and weight of the assembly (and weight may be an important factor, especially in aircraft), but these conventional mounting configurations often require tools to detach or the fasteners are difficult to access.

SUMMARY

In various embodiments, the present disclosure provides a fastener assembly that includes a plunger, a grommet, and a lever arm. The plunger may include a head, a tip portion, and a longitudinal centerline axis. The grommet may be configured to receive the tip portion of the plunger. The tip portion of the plunger may be axially movable relative to the grommet between a latched state and an unlatched state. The lever arm may be coupled to the plunger between the head and the tip portion. The lever arm extends from the plunger at an angle relative to the longitudinal centerline axis, with the lever arm being actuatable to switch the fastener assembly from the latched state to the unlatched state, according to various embodiments.

The lever arm may comprise a first end and a second end, the second end may be coupled to the plunger, and the first end may be disposed so as to be more accessible to a user than the head of the plunger. In various embodiments, the assembly further includes a plate configured to be detachably mounted to a structure. In various embodiments, the grommet comprises a flange and a body portion, the flange of the grommet is configured to engage the plate, and the body portion of the grommet is configured to extend through respective apertures of the plate and the structure. In various embodiments, in the latched state the tip portion of the plunger is in a first position relative to the grommet such that the body portion of the grommet is radially expanded and is thus configured to retain the fastener assembly relative to the structure. In various embodiments, in the unlatched state the tip portion of the plunger is in a second position relative to the grommet such that the body portion of the grommet is radially collapsed and is thus configured to release the fastener assembly relative to the structure. In various embodiments, in the first position the tip portion of the plunger is farther inserted relative to the grommet than in the second position and, correspondingly, in the second position the tip portion of the plunger is farther retracted relative to the grommet than in the first position.

The lever arm may be coupled to the plunger between the flange of the grommet and the head of the plunger. The lever arm may be pivotably coupled to the plunger. In various embodiments, the lever arm comprises a mid-section extending between the first end and the second end, the plate comprises a fulcrum, and the mid-section of the lever arm is configured to directly engage the fulcrum of the plate in response to actuation of the lever arm switching the fastener assembly from the latched state to the unlatched state.

Also disclosed herein, according to various embodiments, is an assembly detachably mounted to an interior structure of an aircraft (e.g., a wall of an aircraft). The assembly may include a plate defining an aperture and a grommet extending through the aperture and through a corresponding aperture of the interior structure of the aircraft. The assembly may also include a plunger comprising a head, a tip portion, and a longitudinal centerline axis, wherein the tip portion of the plunger is axially movable relative to the grommet between a latched state and an unlatched state. Still further, the assembly may include a lever arm pivotally coupled to the plunger, wherein in response to pivoting the lever arm the assembly transitions from the latched state to the unlatched state.

In various embodiments, the plate defines a fastener well, wherein the aperture is defined in a base of the fastener well. In various embodiments, the grommet comprises a flange and a body portion, the flange is engaged against the base of the fastener well, and the tip portion of the plunger is axially movable within the body portion of the grommet. In various embodiments, the grommet comprises a first end, a second end, and a mid-section extending between the first end and the second end. In various embodiments, the second end is pivotably coupled to the plunger between the head of the plunger and the flange of the grommet, a wall of the plate defining the fastener well comprises a fulcrum, and the mid-section of the lever arm directly engages the fulcrum. In response to pivoting the lever arm about the fulcrum, the assembly may transition from the latched state to the unlatched state.

In various embodiments, the assembly further includes a pouch coupled to the plate. The pouch may be detachably coupled to the plate. The pouch may comprise resiliently flexible material. The pouch may define a hole through which a user may engage the first end of the lever arm to actuate the lever arm to transition the assembly from the latched state to the unlatched state. In various embodiments, the plate is an exclusive mounting interface between the pouch and the interior structure of the aircraft. In various embodiments, the plate comprises a plastic thermoformed material. In various embodiments, the wall of the plate defining the fastener well defines a cutout, wherein the lever arm extends through the cutout. In various embodiments, wherein the mid-section of the lever arm comprises a shoulder configured to prevent removal of the lever arm relative to the cutout.

Also disclosed herein, according to various embodiments, is a method of manufacturing an assembly for mounting to a structure. The method may include positioning a grommet into an aperture defined in a plate, inserting a tip portion of a plunger into the grommet, and pivotably coupling a lever arm to the plunger between a head of the plunger and the grommet. The method may further include inserting a first end of the lever arm through a cutout defined in a wall of a fastener well of the plate. In various embodiments, inserting the first end of the lever arm through the cutout defined in the wall of the fastener well of the plate is performed before inserting the tip portion of the plunger into the grommet.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 2 is a cross-sectional view of a fastener assembly being utilized to detachably mount a pouch to a structure, with FIG. 2A showing the fastener assembly in an unlatched state and FIG. 2B showing the fastener assembly in a latched state, in accordance with various embodiments;

Figure 1:
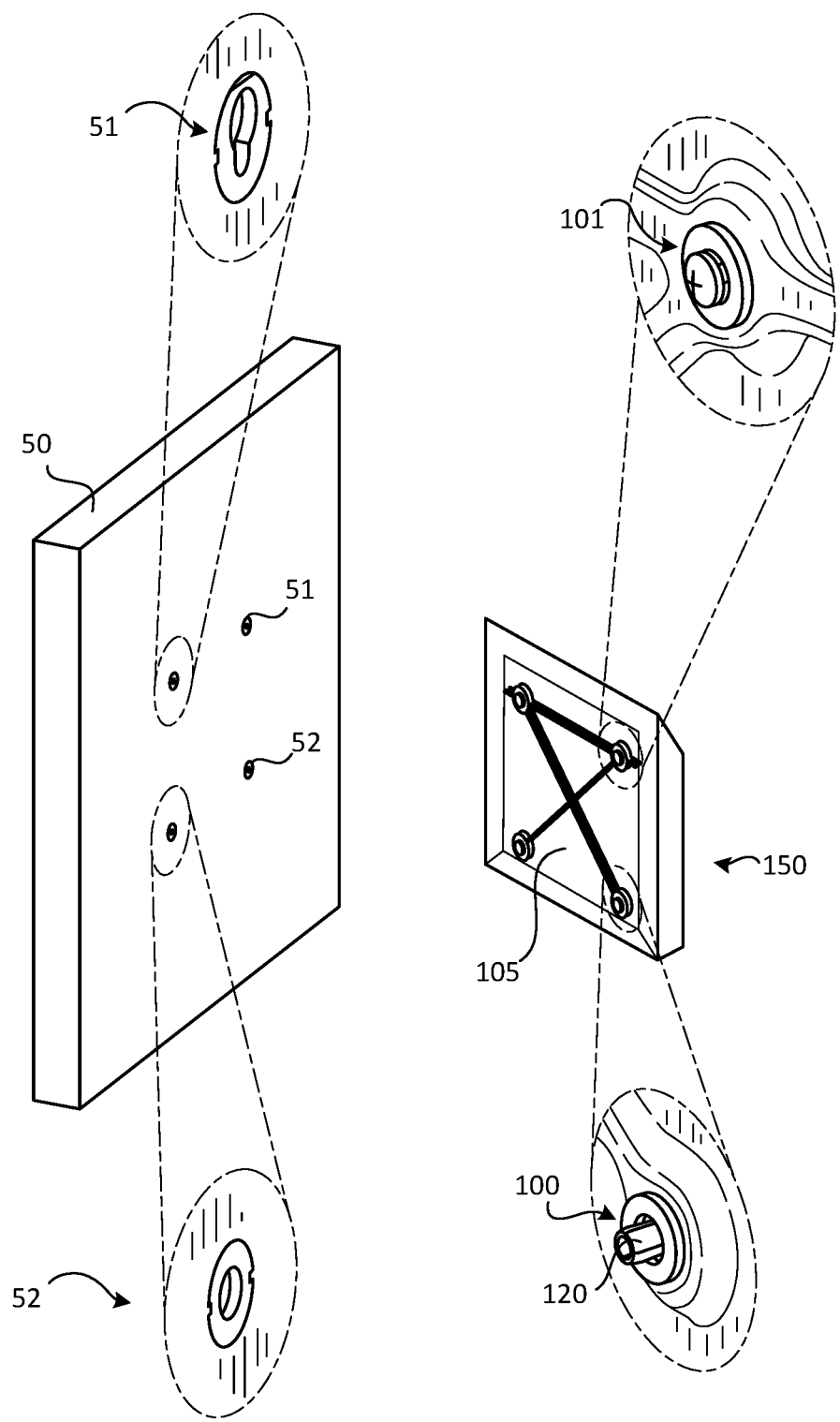
FIG. 1 is a perspective view of a fastener assembly for detachably mounting a component (e.g., a plate) to a structure, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, and with reference to FIG. 1, an assembly for detachably mounting a component to a structure is provided. In various embodiments, the assembly, also referred to herein as a fastener assembly 100, is configured to detachably mount a component, such as plate 105, to a structure, such as panel 50. For example, the plate 105 may be a mounting plate for a pouch 150 (see FIG. 2; e.g., a literature pocket) and the panel/structure 50 may be an aircraft wall to which the pouch 150 attaches (via plate 105). In various embodiments, the fastener assembly 100 enables a single mounting plate 105 to be utilized, as opposed to conventional fastening configurations that utilize two or more plates. Said differently, the plate 105 may be the exclusive mounting interface between the pouch 150 and the back panel 50 of an aircraft wall. In various embodiments, the plate 105 may be made from a plastic, metal (e.g., sheet metal), or composite material. For example, the plate 105 may be a plastic thermoformed material. While numerous details and references are included herein pertaining to implementing the fastener assembly 100 with a pouch 150 for an aircraft wall, the scope of the present disclosure is not limited to such specific aircraft applications, and thus the fastener assembly described and claimed herein may be utilized in other applications.

In various embodiments, and with continued reference to FIG. 1, the panel 50 may have a plurality of interfaces 51, 52 that facilitate the detachable/reversible mounting of the late 105 using the fastener assembly 100. These interfaces 51, 52 may be on an existing aircraft seat, and thus the plate 105 may be manufactured to align and correspond with the predetermined configuration of the interfaces 51, 52. In various embodiments, the panel 50 includes one or more upper interfaces 51 and one or more lower interfaces 52. The upper interfaces 51 may be key-hole apertures and may be configured to receive and retainer a head of a bolt or a screw 101. For example, a screw 101 may be attached to the plate 105 (a foam or padded washer may be disposed between the head of the screw and the plate 105), and head of the screw 101 may be inserted into the larger portion of the key-hole aperture 51 and subsequently the plate 105 may be slid downwards such that the head of the screw 101 is retained in the narrow portion of the key-hole aperture 51. The lower interface(s) 52 may be a standard (e.g., cylindrical) aperture, and a grommet 120 of the fastener assembly 100 may be received within the lower interface 52, as described in greater detail below.

In various embodiments, and with reference to FIGS. 2, 2A, and 2B, the fastener assembly 100 includes a plunger 110, a grommet 120, and a lever arm 130. The plunger 110 may have a head 112 and a tip portion 114, and the plunger 110 may generally have a longitudinal centerline axis extending centrally from the head 112 to and along the tip portion 114. The grommet 120 is generally configured to receive the tip portion 114 of the plunger 110, with the tip portion 114 of the plunger 110 being axially movable relative to the grommet 120. That is, the plunger 110 may be slidable within the grommet 120 between a latched state (FIG. 2B) and an unlatched state (FIG. 2A). For example, the grommet 120 may have a flange 122 and a body portion 124. The body portion 124 may be configured to extend through an aperture 108 (see also FIG. 4) defined in the plate 105 and into the receptacle/interface 52 of the panel 50, and the flange 122 may engage surface of the plate 105 directly surrounding the aperture 108.

In various embodiments, axial movement of the tip portion 114 of the plunger 110 affects the radial expansion/contraction of the body portion 124 of the grommet 120. Said differently, in the latched state (FIG. 2B) the tip portion 114 of the plunger 110 is in a first position relative to the grommet 120 such that the body portion 124 of the grommet is radially expanded and thus retains the fastener assembly 100 relative to the panel 50 (e.g., prevents the grommet 120 from being pulled out of the interface 52), according to various embodiments. In the unlatched state (FIG. 2A) the tip portion 114 of the plunger 110 is in a second position relative to the grommet 120 such that the body portion 124 of the grommet is radially collapsed and is thus configured to enable the fastener assembly 100 to be released/removed from the panel 50, according to various embodiments. In various embodiments, in response to the plunger 110 being in the first position (FIG. 2B) the tip portion 114 of the plunger 110 is farther inserted relative to the grommet 120 than in the second position (FIG. 2A) and, correspondingly, in the second position (FIG. 2A) the tip portion 114 of the plunger 110 is farther retracted relative to the grommet 120 than in the first position (FIG. 2B).

In various embodiments, the lever arm 130 of the fastener assembly 100 generally facilitates the axial movement of the plunger 110. For example, a lever arm 130 may be coupled to the plunger 110 (e.g., between the head 112 and the tip portion 114) and the lever arm 130 may extend from the plunger 110 at an angle relative to the longitudinal centerline axis of the plunger 110. The lever arm 130 may have a first end 131, also referred to as a free end described in greater detail below, and a second end 132 coupled to the plunger 110. The second end 132 may be pivotably coupled to the plunger 110, thus allowing the extension angle of the lever arm 130 relative to the longitudinal centerline axis of the plunger 110 to be altered. In various embodiments, the second end 132 of the lever arm 130 is coupled to the plunger 110 between the head 112 of the plunger 110 and the grommet 120 (e.g., between the head 112 of the plunger 110 and the flange 122 of the grommet 120). In various embodiments, and as described in greater detail below with reference to FIGS. 3A and 3B, the lever arm 130 may include a mid-section (between the first end 131 and the second end 132) that directly engages a fulcrum of the plate 105.

In various embodiments, a first end 131 (FIG. 2) of the lever arm 130 is disposed so as to be more easily accessible to a user, and thus may facilitate switching of the fastener assembly from the latched state to the unlatched state. For example, the pouch 150 (or other component being detachably mounted to a structure using the fastener assembly) may limit visibility and accessibility of the plunger 110, and thus without the lever arm 130 actuation of the plunger/grommet mechanism (described above) would be difficult. For example, a layer of flexible material 109 (e.g., leather, a textile layer, a plastic/composite sheeting, etc.) may be coupled to the plate 105 and may cover the fastener assembly 100, thus preventing items being stowed in the pouch 150 from becoming snagged or retained by the elements of the fastener assembly 100.

In various embodiments, the pouch 150, which may include the flexible material 109, is coupled to the plate 105 (e.g., using hook-and-loop type fasteners, straps, clips, or other such mechanisms). In various embodiments, the pouch 150 may be made from a resiliently flexible material and may be detachably coupled to the plate 105. In various embodiments, the pouch 150 defines a hole 153 (FIG. 2) through which a user may engage the first end 131 of the lever arm 130 to actuate the lever arm 130 to transition the assembly from the latched state to the unlatched state. In various embodiments, the hole 153 is disposed/situated on an under/lower side of the pouch 150 to prevent inadvertent detachment of the plate 105 and/or pouch 150.

Figure 3A:
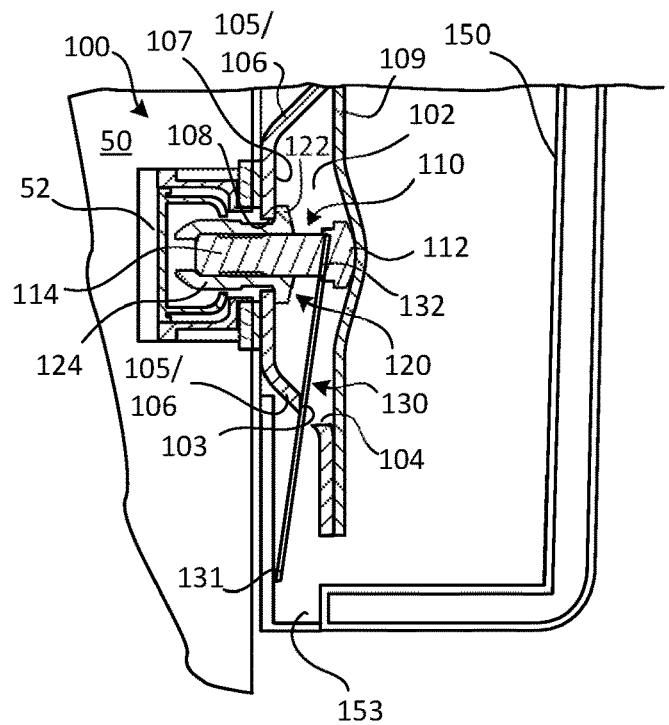
FIG. 3A is a cross-sectional view of a fastener assembly in an unlatched state, in accordance with various embodiments.
Figure 3B:
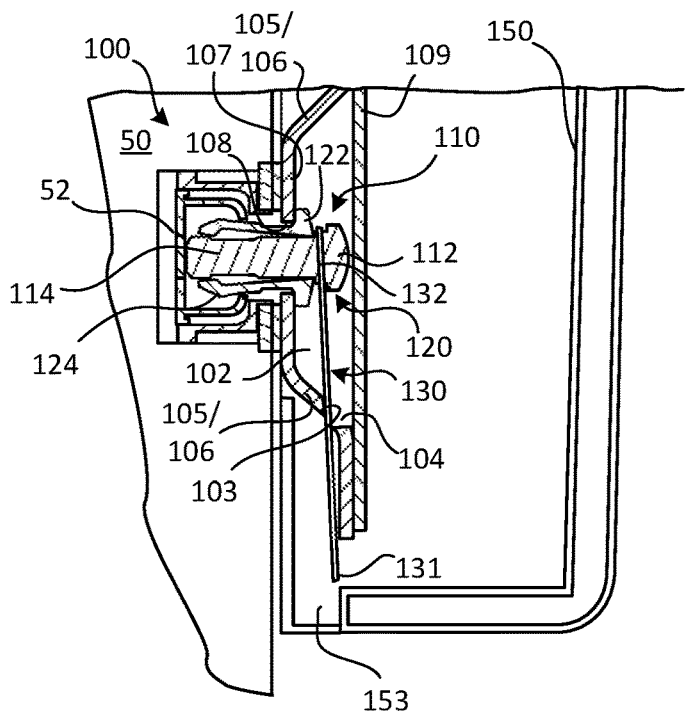
FIG. 3B is a cross-sectional view of a fastener assembly in a latched state, in accordance with various embodiments.
Figure 4:
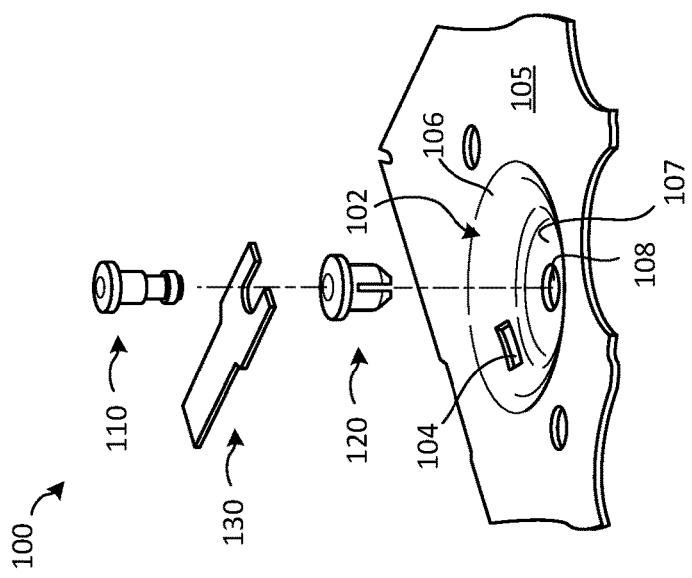
FIG. 4 is an exploded view of a fastener assembly, in accordance with various embodiments.

In various embodiments, and with reference to FIGS. 3A, 3B and 4, the plate 105 includes one or more walls 106 that define a fastener well 102. The aperture 108 of the plate 105 may be defined in a base 107 of the fastener well 102. The flange 122 of the grommet 120 may engage the base 107 of the fastener well 102. The wall 106 of the plate 105 may define a fulcrum 103, and the midsection of the lever arm 130 may directly engage the fulcrum 103. Force exerted on the first end 131 of the lever arm 130 (e.g., by a user grasping the first end 131 via the hole 153) may produce a corresponding torque/force on the second end 132 of the lever arm 130 to change the position of the plunger 110 and thereby change the state of the fastener assembly (e.g., switching from the latched state in FIG. 3B to the unlatched state in FIG. 3A). In various embodiments, the wall 106 of the fastener well 102 of the plate 105 defines a cutout 104 through which a portion of the lever arm 130 extends, as described in greater detail below.

Figure 5A:
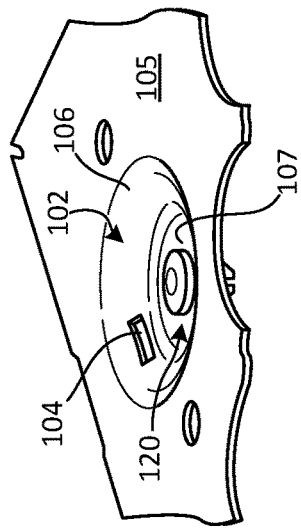
FIGS. 5A, 5B, and 5C are perspective views of various stages of assembling a fastener assembly, in accordance with various embodiments.
Figure 5B:
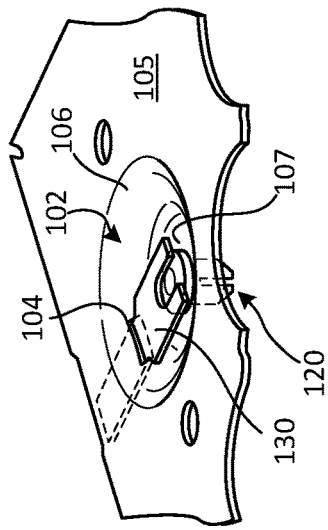
Figure 5C:
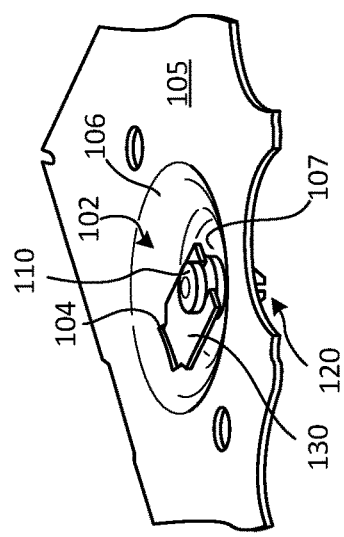

In various embodiments, and with reference to FIG. 4, an exploded view of the fastener assembly 100 is provided. In various embodiments, the lever arm 130 may have a pronged end (e.g., the second end may be pronged) that receives the plunger 110. In various embodiments, and with momentary reference to FIG. 7, the lever arm 730 may define a pass-through hole 731 that receives the plunger 110 thus preventing the lever arm 730 from becoming inadvertently disengaged from the plunger 110. In various embodiments, and with renewed reference to FIG. 4, the pronged end of the lever arm 130 may be retained in place between the grommet 120 and the head of the plunger 110. The lever arm 130 may also comprise a shoulder that engages the surface of the wall 106 of the fastener well 102 adjacent the cutout 104, thereby preventing the lever arm 130 from being removed. Accordingly, the lever arm 130 may not necessarily be actively or positively coupled to the plunger 110, but may be engaged against the plunger and may be retained in such a configuration that allows the lever arm 130 to toggle in the manner described but prevents the lever arm 130 from being withdrawn from the assembly. In various embodiments, and with reference to FIGS. 5A, 5B, and 5C, various stages of assembling the fastener assembly 100 are shown, as described in greater detail below with reference to FIG. 6.

Figure 6:
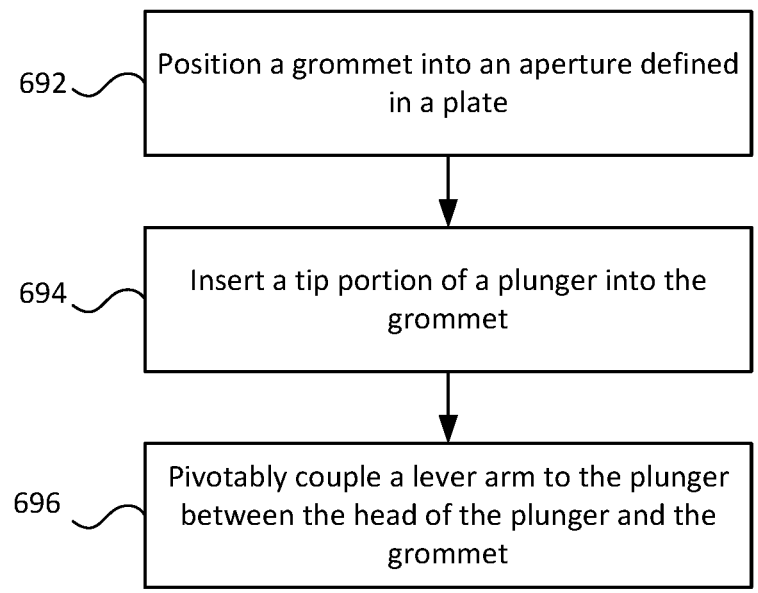
FIG. 6 is a schematic flow chart diagram of a method of manufacturing an assembly for mounting to a structure, in accordance with various embodiments.
Figure 7:
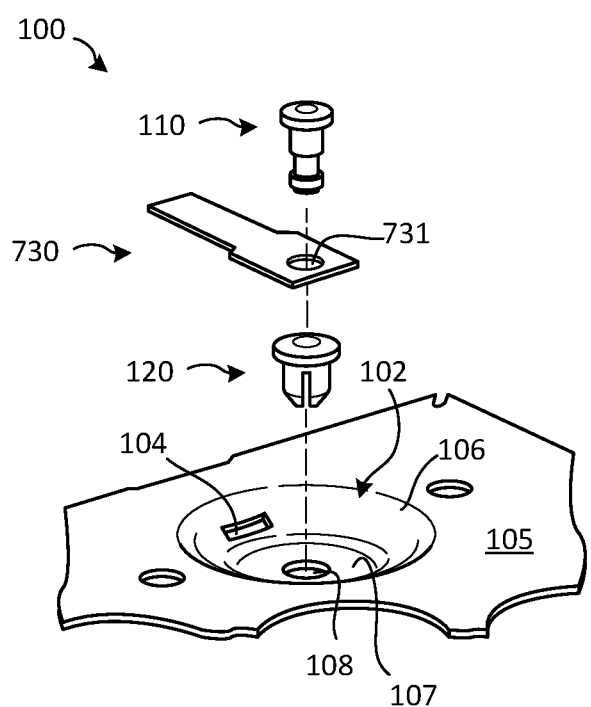
FIG. 7 is an exploded view of a fastener assembly, in accordance with various embodiments.

In various embodiments, and with reference to FIG. 6, a schematic flow chart diagram of a method 690 of manufacturing an assembly (e.g., the fastener assembly 100) is provided. The method 690 may include positioning the grommet 120 into an aperture (e.g., aperture 108) defined in the plate 105 at step 692 (see also FIG. 5A). The method 690 may further include inserting the tip portion 114 of the plunger 110 into the grommet 120 at step 694 and pivotably coupling the lever arm 130 to the plunger 110 at step 696. In various embodiments, step 696 may include sandwiching the second end of the lever arm 130 between the head of the plunger 110 and the grommet 120 (see also FIGS. 5B and 5C). In various embodiments, the method 690 further includes inserting the first end 131 of the lever arm 130 through a cutout (e.g., cutout 104). This step may be performed before inserting the tip portion 114 of the plunger 110 into the grommet 120.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fastener assembly comprising:
a plunger comprising a head, a tip portion, and a longitudinal centerline axis;
a grommet configured to receive the tip portion of the plunger, wherein the tip portion of the plunger is axially movable relative to the grommet between a latched state and an unlatched state;
a lever arm coupled to the plunger between the head and the tip portion, wherein the lever arm extends from the plunger at an angle relative to the longitudinal centerline axis, wherein the lever arm is actuatable to switch the fastener assembly from the latched state to the unlatched state; and
a plate configured to be detachably mounted to a structure, wherein a wall of the plate defines a fastener well, wherein the wall of the plate defining the fastener well defines a cutout, wherein the lever arm extends through the cutout.

2. The fastener assembly of claim 1, wherein:
the lever arm comprises a first end and a second end;
the second end is coupled to the plunger; and
the first end is disposed so as to be more accessible to a user than the head of the plunger.

3. The fastener assembly of claim 2, wherein:
the grommet comprises a flange and a body portion;
the flange of the grommet is configured to engage the plate; and
the body portion of the grommet is configured to extend through respective apertures of the plate and the structure.

4. The fastener assembly of claim 3, wherein:
in the latched state the tip portion of the plunger is in a first position relative to the grommet such that the body portion of the grommet is radially expanded and is thus configured to retain the fastener assembly relative to the structure;
in the unlatched state the tip portion of the plunger is in a second position relative to the grommet such that the body portion of the grommet is radially collapsed and is thus configured to release the fastener assembly relative to the structure; and
in the first position the tip portion of the plunger is farther inserted relative to the grommet than in the second position and, correspondingly, in the second position the tip portion of the plunger is farther retracted relative to the grommet than in the first position.

5. The fastener assembly of claim 3, wherein the lever arm is coupled to the plunger between the flange of the grommet and the head of the plunger.

6. The fastener assembly of claim 3, wherein the second end of the lever arm is pivotably coupled to the plunger.

7. The fastener assembly of claim 6, wherein:
the lever arm comprises a mid-section extending between the first end and the second end;
the plate comprises a fulcrum; and
the mid-section of the lever arm is configured to directly engage the fulcrum of the plate in response to actuation of the lever arm switching the fastener assembly from the latched state to the unlatched state.

8. An assembly detachably mounted to an interior structure of an aircraft, the assembly comprising:
a plate defining an aperture;
a grommet extending through the aperture and through a corresponding aperture of the interior structure of the aircraft;
a plunger comprising a head, a tip portion, and a longitudinal centerline axis, wherein the tip portion of the plunger is axially movable relative to the grommet between a latched state and an unlatched state;

a lever arm pivotally coupled to the plunger, wherein in response to pivoting the lever arm the assembly transitions from the latched state to the unlatched state; and a wall of the plate defining a fastener well, wherein the wall of the plate defining the fastener well defines a cutout, wherein the lever arm extends through the cutout.

9. The assembly of claim 8, wherein:

the aperture of the plate is defined in a base of the fastener well;

the grommet comprises a flange and a body portion;

the flange is engaged against the base of the fastener well;

the tip portion of the plunger is axially movable within the body portion of the grommet;

the lever arm comprises a first end, a second end, and a mid-section extending between the first end and the second end;

the second end is pivotably coupled to the plunger between the head of the plunger and the flange of the grommet;

the wall of the plate defining the fastener well comprises a fulcrum;

the mid-section of the lever arm directly engages the fulcrum; and in response to pivoting the lever arm about the fulcrum, the assembly transitions from the latched state to the unlatched state.

10. The assembly of claim 9, further comprising a pouch coupled to the plate.

11. The assembly of claim 10, wherein the pouch is detachably coupled to the plate.

12. The assembly of claim 10, wherein the pouch comprises resiliently flexible material.

13. The assembly of claim 10, wherein the pouch defines a hole through which a user may engage the first end of the lever arm to actuate the lever arm to transition the assembly from the latched state to the unlatched state.

14. The assembly of claim 10, wherein the plate is an exclusive mounting interface between the pouch and the interior structure of the aircraft.

15. The assembly of claim 14, wherein the plate comprises a plastic thermoformed material.

16. The assembly of claim 9, wherein the mid-section of the lever arm comprises a shoulder configured to prevent removal of the lever arm relative to the cutout.

17. A method of manufacturing an assembly for mounting to a structure, the method comprising:

positioning a grommet into an aperture defined in a plate;

inserting a first end of a lever arm through a cutout defined in a wall of a fastener well of the plate;

inserting a tip portion of a plunger into the grommet; and pivotably coupling a lever arm to the plunger between a head of the plunger and the grommet.

18. The method of claim 17, wherein inserting the first end of the lever arm through the cutout defined in the wall of the fastener well of the plate is performed before inserting the tip portion of the plunger into the grommet.

* * * * *